Nov. 7, 1967 G. W. MORRISON 3,351,222
TRASH HAULING TRUCK
Filed Aug. 9, 1965 3 Sheets-Sheet 2

GEORGE W. MORRISON
INVENTOR.

BY

ATTORNEY

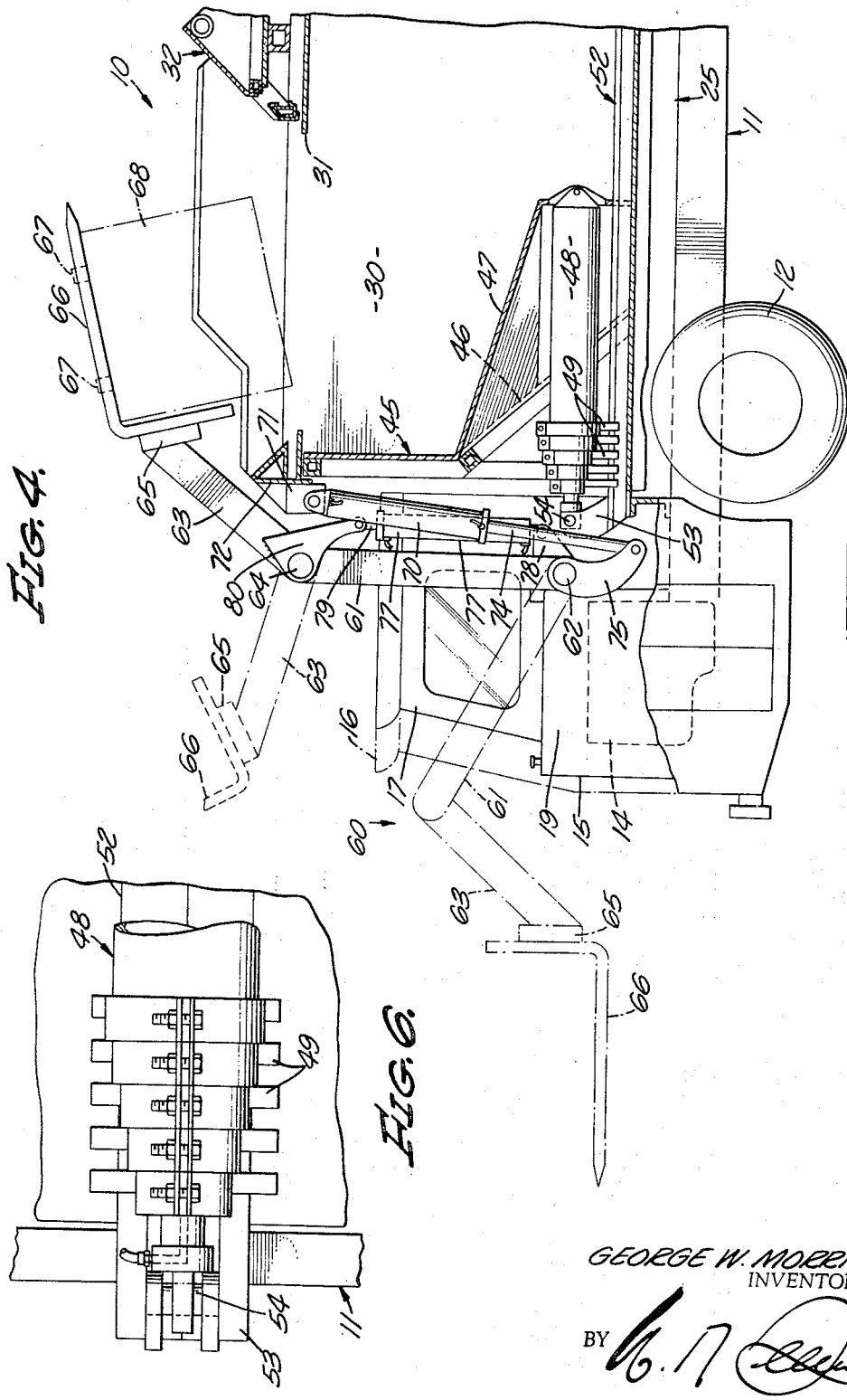

United States Patent Office 3,351,222
Patented Nov. 7, 1967

3,351,222
TRASH HAULING TRUCK
George W. Morrison, Inglewood, Calif., assignor to Western Body and Hoist Company, Inc., Los Angeles, Calif., a corporation of California
Filed Aug. 9, 1965, Ser. No. 478,124
14 Claims. (Cl. 214—302)

This invention relates to the handling of trash and more particularly to an improved motor vehicle or truck having the engine and crew compartments located forwardly of the front wheels and featuring power operated front end type loading means for elevating trash into a receiving hopper or the like with its operating linkage arranged clear of and entirely to one side of the passageway leading into both crew compartments.

Trash hauling trucks are in widespread use utilizing self-loading means mounted across the front end and functioning to elevate bins of trash into the top of a trash storage chamber. The linkages utilized to operate these self-loading assemblies are mounted along each side of the front end of the truck and pivoted to the frame rearward of the crew compartment with the result that the linkages operate in planes crossing the passageways used by the crew in entering and leaving the truck. This presents a serious hazard to the crew for obvious reasons.

In efforts to avoid and minimize this hazard it has been proposed to utilize linkages of a generally inverted U-configuration and so arranged that no part of the linkages actually traverses the passageway into and from the crew compartment. This expedient minimizes the hazard without however eliminating it. In addition, this expedient necessitates the use of operating linkages which are excessively cumbersome and heavy. Furthermore, the rear leg of the inverted U-members operates through an arc alongside the body of the truck and presents a hazard to objects as well as personnel in the path of its movement.

A further and serious handicap is the fact that prior arrangements of front end type self-loaders have linkages which prevent or seriously interfere with the use of rear view mirrors so important to the driver in the safe operation of the vehicle and required by law to be present. Power-operated retractable mirror mounts have been proposed to meet this problem but the crew frequently forgets to retract the mirrors before operating the loader or to extend the mirrors before starting to move the truck.

The foregoing and other disadvantages of prior art constructions are entirely avoided by the present invention utilizing a specially designed truck chassis having a compact wheel base greatly facilitating the maneuverability of the truck, particularly in cramped quarters and greatly increasing the payload because permitting the front wheels to carry their full share of the load. The front wheels are located rearward of the propelling engine thereby permitting the engine to be lower than otherwise feasible. In particular, relocation of the front wheels permits the crew space to be split into two compartments located along either forward corner of the truck and forward of the front wheels with the floor at minimum clearance distance above the pavement. This enables the crew to step in and out of the compartments with ease and the driver to operate the vehicle optionally from either a seated or a standing position.

Additionally, a particular feature of the design is the novel arrangement of operating linkages for the loading device and the location of these linkages along the inboard sides of the two crew compartments and in the area directly overlying the truck engine. Relatively short arms can be employed advantageously in the operating linkages which are easily operated by power cylinders, one pair of which is mounted vertically along the front end of the trash compartment, and the other pair of which is carried by the linkage itself. The latter pair functions to maintain the bin generally level during elevation and thereafter to dump its contents into a receiving hopper crosswise of the front end of the main storage chamber.

Another feature of the design is the use of a powerful pusher normally serving as the front wall of the receiving hopper and at other times as the means for transferring the trash into the main storage chamber and to crush it against prior deposits. This pushing means may be utilized later to discharge the contents of the truck into a dump after the rear doors of the chamber have been opened.

Accordingly, it is a primary object of the present invention to provide a new and improved self-loading trash hauling truck featuring a short coupled wheel base located rearward of the engine, the loader and of the crew compartment.

Another object of the invention is the provision of a cargo truck having a power operated loading device pivotally supported on its front end and having operating linkages arranged to operate in a path entirely clear of the entrance way to the crew compartment.

Another object of the invention is the provision of a trash truck having a walk-in driving compartment in one front corner and located entirely to one side of the path of operation of a power loading device pivotally mounted on the front end of the truck.

Another object of the invention is the provision of a trash truck having a front end loader provided with a pair of operating linkages located on the inboard side of the driver compartment.

Another object of the invention is the provision of a trash truck having a closed storage chamber provided with a top-opening receiving hopper across one end and having one wall thereof movably supported for use as a trash crusher and transfer device, and including a pressure-operated power means therefor supported above the front wheels of the truck effective to crush and transfer trash from the hopper to the main storage chamber.

Another object of the invention is the provision of a truck chassis having its engine and radiator assembly confined compactly centrally of its forward end and featuring narrow upwardly-opening slots along the sides to accommodate operating arms for self-loading and the like equipment operating in a vertical plane and along the inboard side of the driver compartment.

Another object of the invention is the provision of a short wheel base truck chassis having its front wheels rearward of the driver compartment and the propelling engine.

Another object of the invention is the provision of a truck chassis having separate compartments with low level step-in, step-out bottoms and having their inboard sides spaced from the adjacent sides of the engine and radiator assembly to provide operating space for power operated arms pivotally connected at one end to the truck chassis.

Another object of the invention is the provision of a truck chassis having power operated equipment attached to its forward end in an area overlying the engine and operating through a vertical zone inboard from a pair of rear view mirror units mounted on the front corners of the truck and arranged to view the opposite sides of the vehicle from the driving compartment.

Another object is the provision of a trash handling assembly mountable on a truck chassis and featuring a self-loading device secured to its forward end and adapted to operate in the area overlying the engine of a chassis on which said assembly is secured.

These and other more specific objects will appear upon reading the following specification and claims and upon considering in connection therewith the attached drawings to which they relate.

Referring now to the drawings in which a preferred embodiment of the invention is illustrated.

FIGURE 4 is a fragmentary view, partly in section, of the front end of the truck showing the trash elevating and loading mechanism in different operating positions;

FIGURE 5 is a fragmentary cross-sectional view taken along line 5—5 of FIGURE 1; and FIGURE 6 is a fragmentary cross-sectional view of the front end portion of the pusher ram assembly.

Figure 1:
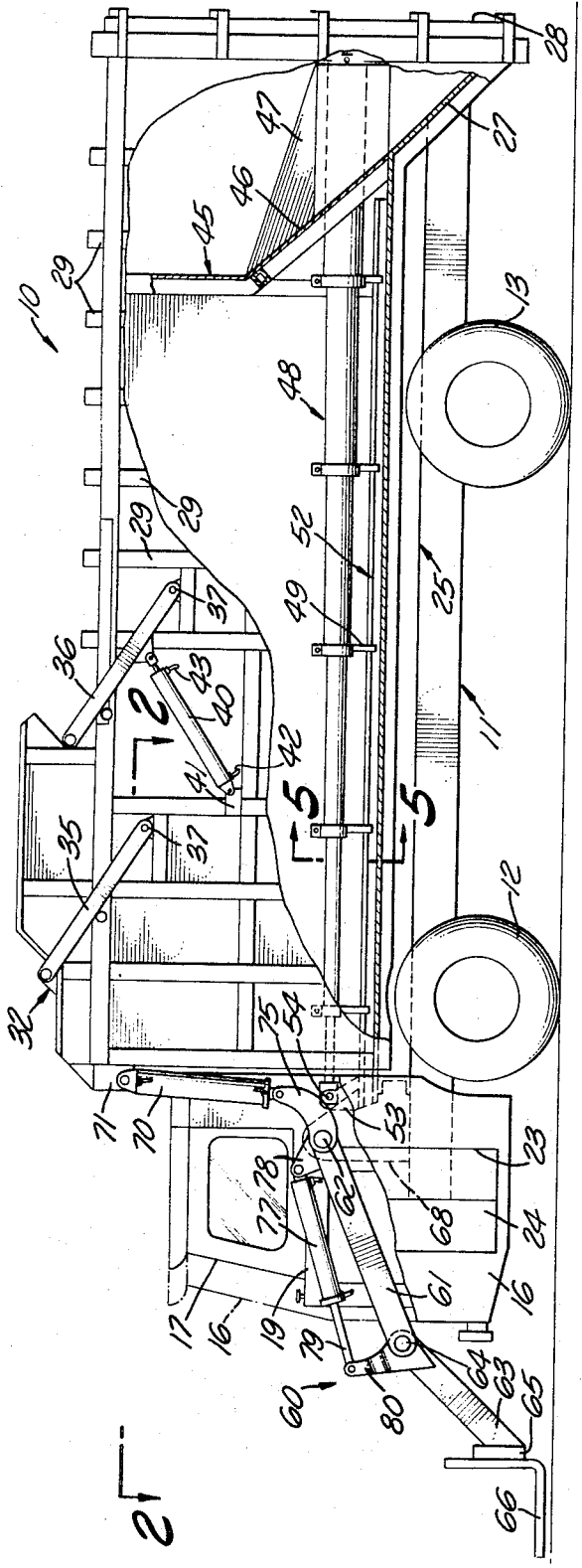
FIGURE 1 is a side elevational view with parts broken away to show constructional details and illustrating one preferred embodiment of the invention.
Figure 2:
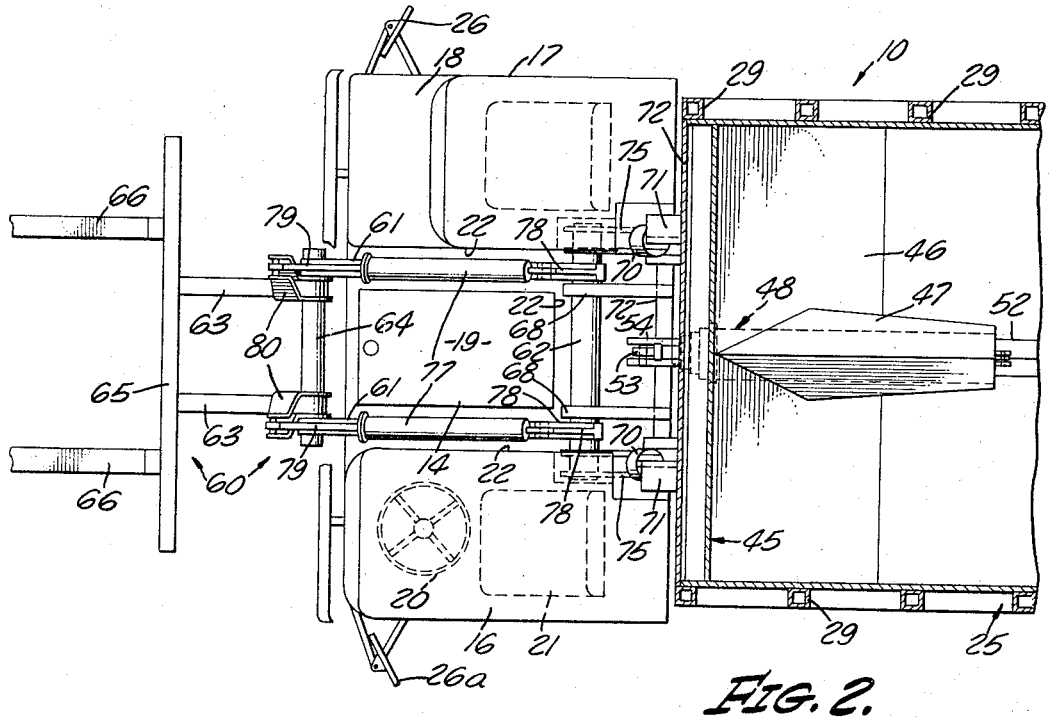
FIGURE 2 is a cross-sectional view taken along line 2—2 on FIGURE 1.

Referring more particularly to FIGURE 1, there is shown a trash truck designated generally 10 having a chassis 11 equipped wtih front and rear pairs of wheels 12 and 13. Front wheels 12 are located well rearwardly of the front end of the chassis and of the propelling engine generally indicated at 14 (FIGURES 2, 4). To be noted is the fact that this engine is located very close to and centrally of the front end between a pair of compartments 16 and 17. Compartment 16 is located on the left front corner and is occupied by the vehicle driver. Compartment 17 is located on the right corner and accommodates one or more crewmen. This latter compartment is of shorter length than the driver compartment thereby leaving room for a platform 18 across its front accommodating one or two crewmen in a standing position. The foreshortening of compartment 17 has the further important advantage of providing the driver with an unobstructed view to rear view mirror means 26 suitably supported on a bracket carried by the right forward corner of the frame. A second and similar mirror unit 26a is mounted on the left forward corner of compartment 16 providing the driver with a clear view along the left side of the truck. As is apparent both mirrors are rigidly and fixedly supported in their properly adjusted positions and are far removed from the operating path of the self-loading device for reasons which will become apparent presently. Driver compartment 16 is provided with an upright steering wheel 20 forward of a collapsing seat 21. Suitable controls, not shown, such as accelerator and brake, are arranged for operation by the driver from either a standing or seated position.

Compartments 16 and 17 have their inboard sides spaced laterally from the adjacent sides of engine and its cooling radiator 15 (FIGURES 2, 3), the engine preferably being enclosed by a housing 19 (FIGURES 2, 4). Surrounding the sides and rear end of this housing is a narrow upwardly opening slot 22 providing space for the arms of a self-loading device to be described below or the similar arms of a wide variety of other equipment advantageously mountable on the front end of the chassis. Accordingly it will be understood that the self-loader herein disclosed is merely typical of equipment which can be accommodated in the slots provided by use of the design features embodied in the present invention.

Each of the compartments 16, 17 is provided with an entranceway 23 preferably equipped with a door 24. Although these doors are shown located in the outboard sides of the respective compartments it will be understood that, if desired, the doorways can be located across the front ends of these compartments, or even in the rear portion, without in any way exposing members of the crew to the risk of injury from operating parts of the loading mechanism for reasons which will become apparent below.

Suitably mounted on chassis 11 is any suitable form of trash storage chamber 25. This chamber may be pivotally connected crosswise of the rear end of the chassis, if desired, so that it can be tilted upwardly in a well known manner when dumping the contents through the rear end. However, as here shown, such up-ending is not necessary. To this end the floor of chamber 25 includes a downwardly inclined portion 27 crosswise of its rear end, this end being normally closed by heavily reinforced doors 28. The interior of the compartment is smooth surfaced throughout and all reinforcing, such as the channel members 29, being secured to the exterior side walls and top by welding or rivets.

Mounted crosswise of the front end of compartment 25 is a receiving hopper 30 (FIGURE 4) having an inlet opening 31 crosswise of its top. This opening is normally closed by a closure 32, the details of which are disclosed in my co-pending application for United States Letters Patent, Ser. No. 478,076, filed concurrently herewith. This closure is arranged to be elevated through a shallow arc between its open and closed position by a pair of links 35, 36 arranged along the exterior sides of chamber 25 and pivoted thereto at 37. A pair of power cylinders 40 have their lower ends secured to the truck body on brackets 41 and their upper ends connected to the mid-portions of links 36 functioning to open and close cover 32. Pressurized fluid is supplied either to the upper or lower ends of these double acting cylinders through hoses 42, 43 to swing links 35, 36 lengthwise of the truck while lifting the closure 32 between its open and closed positions. The control valves for cylinders 40 may be located in the driver's compartment or at any other convenient location.

The front wall of hopper 30 is formed by a pusher unit designated generally 45 and serving additionally as the closure for the front end of trash compartment 25. This pusher unit is slidably supported for movement throughout the length of chamber 25 and includes a downwardly and rearwardly inclined wall 46 as well as a doghouse portion 47 rigidly secured to the central portion of the pusher to enclose the forward end of a multiple-stage powerful ram 48. The rear end of each stage of this ram includes a C-shaped guide flange and support 49 the inturned lugs 50 of which embrace the opposite edges of an I-beam 52 extending along the longitudinal center of the bottom of the storage chamber. The forward end of I-beam 52 projects forwardly of the storage chamber and supports an upright bracket 53 forwardly of front wheels 12 and to which the forward end of the ram is pivotally connected by a pin 54.

The self-loading device for elevating trash into the top of the hopper, designated generally 60, comprises a pair of operating linkages of similar construction lying generally parallel to one another closely beside the inboard side walls of compartments 16, 17. The description of the structural details of one linkage will suffice for both. Referring more particularly to FIGURES 1 and 2 it will be understood that each linkage comprises a main arm 61 rigidly secured to a cross shaft 62 journaled in suitable brackets 68 secured to the main frame supporting storage chamber 25. A second and shorter arm 63 is pivotally mounted on a shaft 64 journaled in the outer ends of the main arm 61. Rigidly secured crosswise of the outer ends of the two shorter arms 63, 63 is a cross member 65 carrying a pair of L-shaped fork lifts 66. The horizontal portions of these fork lifts are insertable through loops or stirrups 67 secured to the underside of a trash bin 68. The power means for operating the loading device, as herein shown, comprises a pair of double action hydraulic cylinders 70 having their upper ends pivotally connected to brackets 71 secured to a cross member 72 (FIGURE 3) rigidly attached to the upper forward corner of trash container 25. Piston rods 74 projecting from the lower end of cylinder 70 are pivotally connected to a crank arm 75 welded or otherwise fixed to the outer ends of shaft 62.

The power means for operating the shorter arms 63 comprises a hydraulic cylinder 77 having one end pivotally connected to a bracket 78 welded or otherwise securely fixed to the upper rear end of main arm 61. The piston rod 79 of this cylinder is connected to a crank arm 80 welded to arms 63. It will be understood that each of the power cylinders is of the double acting type and that each includes suitable flexible hoses extending to a source of pressurized fluid and to a circulating pump and to control valves located either in the driver's compartment or in a convenient operating position adjacent the forward end of the truck.

*Operation*

The operation of the described self-loading trash hauling vehicle will be quite apparent from the foregoing detailed description of its components and their operating relationship one to the other. While the truck is in motion, loading device 60 will usually occupy an intermediate elevated position, with shorter arms 63 overlying the engine as indicated in dot and dash lines in FIGURE 4. Under these conditions, closure 32 is closed across hopper inlet opening 31 to prevent trash from escaping. Pusher 45 is also located in the position shown in FIGURE 4 thereby closing the front end of storage chamber 25.

Upon arrival at a place of trash pick-up, the operator manipulates the control valves for each of cylinders 70, 77 to lower the loading device to the position shown in FIGURE 1, cylinders 70 then being fully retracted and cylinders 77 being partially extended. The operator also admits fluid to the lower end of the closure operating cylinders 40 to extend these cylinders and shift the hopper closure 32 to its open position rearward of the rear edge of hopper opening 31.

After trash bin 68 has been loaded, the loading device control valves, not shown, are manipulated to admit fluid to the upper end of cylinders 70 thereby extending these cylinders to pivot the two linkages in unison upwardly about the axis of shaft 62. As these arms are moving upwardly, the control valve for cylinders 77 is also manipulated in a manner to maintain the bin in a proper position to retain its contents and until ready for dumping. As arms 61 approach their upright position, cylinders 77 are operated to pivot arms 63 clockwise into the dumping position illustrated in full lines in FIGURE 4 thereby transferring the trash into hopper 30.

After one or more bin loads have been discharged into the hopper, the operator manipulates the control valves for pusher ram 48 thereby supplying pressurized fluid centrally through the ram and into the forward ends of the various stages thereby extending the ram rearwardly along the bottom of hopper 30. Normally, this pusher is operated merely across the bottom of the hopper and is thereafter retracted by directing the flow of fluid to the forward ends of the ram stages.

The operation just described continues through repeated operating cycles of both the loading device and pusher 45 until the truck is fully loaded. Between loading operations the hopper closure will usually be operated so as to be open only during periods when trash is being dumped into the hopper. In other words, the hopper is closed normally during the operation of pusher 45 as well as whenever the truck is in movement.

After the truck has been loaded, it is routed to a dump yard and the rear doors 28 are swung open following which the powerful ram 48 is operated to push the entire contents of chamber 25 rearward. By the time the pusher has been extended until its inclined surface 46 is aligned with the inclined bottom portion 27 of the storage chamber, all of the contents will have been discharged into the dump. The fluid flow to the ram is then reversed and the pusher is power-retracted to its normal position shown in FIGURE 4.

Figure 3:
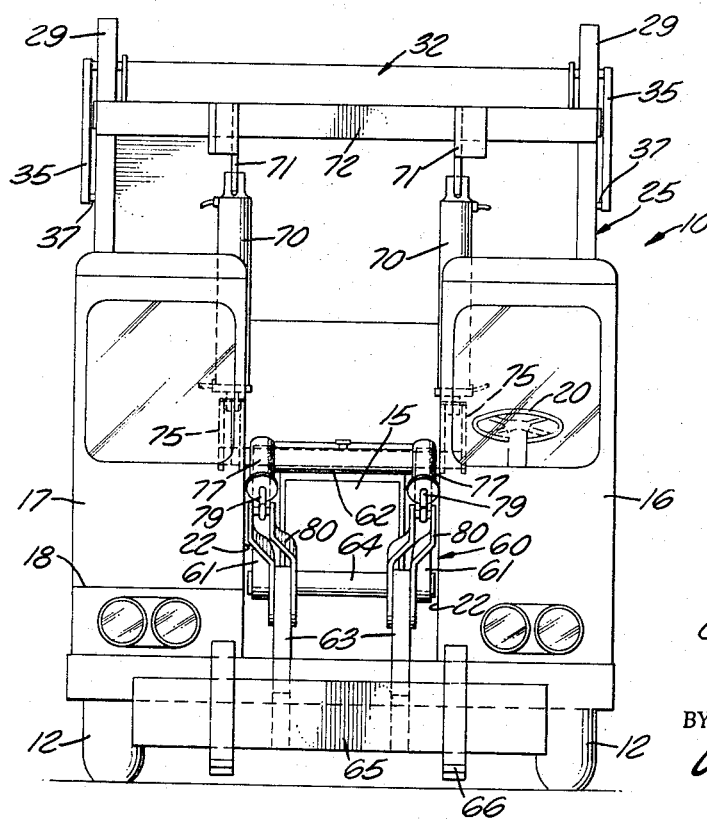
FIGURE 3 is a front elevational view of FIGURE 1.

As is made clear by FIGURES 2 and 3 in particular, it will be apparent that all operating movements of the loading device 60 take place in a vertical path between the inboard sides of crew compartments 16 and 17. Thus the forward and outboard faces of these compartments are completely removed from the path of movement. Either the driver or his assistants may enter or leave their respective compartments or platform 18 (FIGURE 2) at all times without risk of injury and without regard to whether the loading device is or is not in operation.

It is further pointed out that the driver may attach rear view mirrors at any appropriate position on the front or either outboard side of both compartments without interfering with the operation of either the mirrors or the loading device.

While the particular trash hauling truck herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A trash hauling truck of the front loading type, said truck having an engine propelled chassis equipped with trash receiving means, enclosed crew compartments at either forward corner of said chassis, power operated loading means for transferring trash from street level forward of said truck to a dumping position overlying said engine and said crew compartments, said loading means including motor powered linkage means located between said crew compartments and pivotally connected to the front portion of said truck for arcuate movement in a vertical plane extending lengthwise of said truck, one of said crew compartments comprising a driver station for said truck located laterally of the path of movement of said linkage means whereby the driver may enter and leave said driving station without crossing said path movement.

2. A trash hauling truck as defined in claim 1 characterized in that said driver station has a floor at a level below the bottom of said propelling engine.

3. A trash hauling truck as defined in claim 1 characterized in that the other of said compartments comprises a passenger compartment on the front corner of said truck opposite that occupied by said driver station, said driver station and passenger compartments having floors closely spaced above the street surface for walk-in use, and a doorway for said passenger compartment arranged for use without crossing the path of movement of said linkage means.

4. A truck having an engine mounted forward of the front wheels thereof and beside the inboard sides of a pair of low-level passenger compartments, respectively, located one ahead of each front wheel with the floor thereof closely spaced above the street for walk-in walk-out use, cargo loading means movably mounted on the front end of said truck between the inboard sides of said passenger compartments for movement in a vertical path extending lengthwise of said truck between a street-level loading position and an overhead dumping position, said loading means comprising a linkage assembly pivotally secured to said truck on an axis extending crosswise of said truck, said linkage assembly having a width less than the spacing between the adjacent inboard lateral sides of said passenger compartments, and reversible fluid motor means carried by said truck and operatively connected to said linkage assembly for operating the same between said loading and dumping positions.

5. A trash hauling truck having a chassis supporting a closed low-height trash container means, said chassis having front and rear pairs of wheels disposed beneath the opposite end portions of said trash container, said trash container means including a trash-receiving hopper overlying said front pair of wheels, a propelling engine forward of said front wheels, a driver compartment forward of said hopper and one of said front wheels, and power-operated loading means disposed astride said engine and entirely to one lateral side of said driver compartment and operable to transfer trash from a loading position in front of said propelling engine into the top of said hopper.

6. A trash hauling truck as defined in claim 5 characterized in the provision of pusher means operable lengthwise of said truck for transferring trash from said hopper into portions of said trash container rearward of said hopper, and generally horizontally disposed ram means having its forward end supported on said truck at a point forward of the axle for said front pair of wheels.

7. A trash hauling truck as defined in claim 6 characterized in that said ram means includes a plurality of telescopically assembled sections and having an extended length in excess of the wheel base of said truck, and said ram means when contracted being positioned centrally of the area overlying said front pair of wheels.

8. A cargo truck having a chassis, an engine centrally of the forward end of said chassis, crew compartment means including a driver operating compartment on the front corner of said truck and laterally of said engine, and power operated self loading means pivotally connected crosswise of the front end of said truck and including arm means movable in a vertical plane lengthwise of the forward end of said truck in a vertical slot opening upwardly in a narrow space between the inboard side of said crew compartment means and the adjacent side of said engine.

9. A truck chassis having front wheels spaced rearward of the front end thereof, an engine and radiator therefor supported centrally of the front end of said chassis, bracket means carried by said chassis adjacent either side of said engine and near the rear end thereof, and the space immediately adjacent either lateral side of said radiator and engine opening upwardly and being free of obstructions and adapted to receive supporting arm means straddling said engine for material handling equipment movable vertically past the sides of said engine and radiator from pivot connections with said bracket means.

10. A truck as defined in claim 9 characterized in the provision of hood means for said engine extending rearward from said radiator and enclosing the top and sides of said engine inwardly of the path of movement of said arm means when pivotally connected to said bracket means.

11. A truck chassis having an engine and radiator assembly mounted centrally of its forward end and forward of the steerable front wheels, a compartment for the driver on one forward corner forwardly of and extending downwardly in front of the adjacent front wheel, the inboard side of said driver compartment being spaced laterally from the adjacent side of said radiator and engine assembly to provide an upwardly opening unobstructed slot extending lengthwise of said chassis and adapted to accommodate arm means movable vertically within said slot and alongside the inboard side of said driver compartment.

12. A truck chassis as defined in claim 11 characterized in that said upwardly opening slot extends along either side of said engine and radiator assembly and across the rear end of said engine.

13. A truck chassis as defined in claim 12 characterized in the provision of a housing for said engine the side and rear end walls of which form the side walls of said slot closest to said engine.

14. A truck having a chassis equipped with steerable front wheels, a narrow compartment at either forward corner of the chassis, said chassis having an engine between the inboard sides of said compartments, one of said compartments serving as the driver compartment, the other compartment being set back from the forward face of the driver compartment to provide the driver with an unobstructed view of rear view mirror means fixed to the right hand forward corner of the chassis and adjusted to permit the driver to view the right hand side of said truck when in his normal driving position, and the space overlying said engine between the inboard sides of said compartments being adapted to accommodate power operated equipment.

References Cited

UNITED STATES PATENTS

| | | | |
|---|---|---|---|
| 2,781,102 | 2/1957 | Prichard | 296—28 X |
| 2,824,658 | 2/1958 | Beasley | 214—302 |
| 2,845,133 | 2/1958 | Norrie et al. | 296—28 X |
| 2,860,795 | 11/1958 | Zoller | 214—303 |
| 2,889,944 | 6/1959 | Clark et al. | 214—82 |
| 2,949,199 | 8/1960 | Jones | 214—78 X |
| 2,995,261 | 8/1961 | Soyland et al. | 214—138 |
| 3,047,172 | 7/1962 | Ulinski | 214—778 |
| 3,055,699 | 9/1962 | May | 296—28 |
| 3,195,744 | 7/1965 | Wender | 214—82 |
| 3,241,693 | 3/1966 | Stroker | 214—765 X |
| 3,252,602 | 5/1966 | Bowles | 214—82 |

FOREIGN PATENTS

| | | |
|---|---|---|
| 826,549 | 1/1952 | Germany. |
| 1,022,156 | 1/1958 | Germany. |

HUGO O. SCHULZ, *Primary Examiner.*